Dec. 6, 1966 G. J. SNYDER 3,290,000
DRAIN VALVE FOR REMOVING SETTLING MATERIAL
Filed April 8, 1964
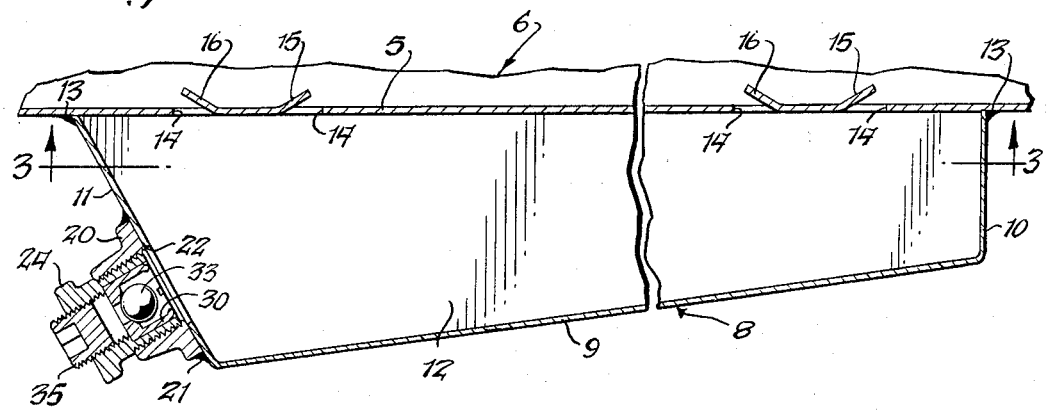
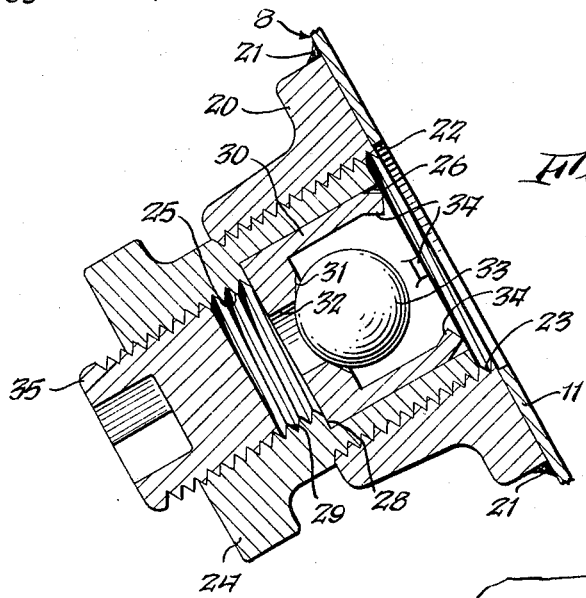
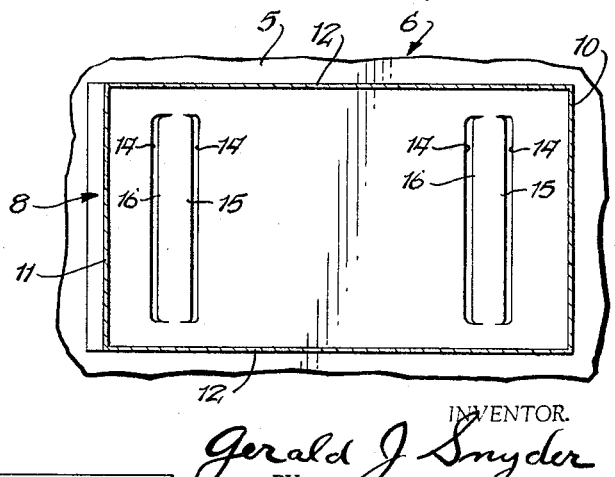
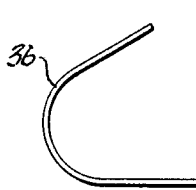
INVENTOR.
Gerald J. Snyder
BY
Popp and Sommer
ATTORNEYS.

United States Patent Office 3,290,000
Patented Dec. 6, 1966

3,290,000
DRAIN VALVE FOR REMOVING
SETTLING MATERIAL
Gerald J. Snyder, 7213 Old Lakeshore Road,
Lake View, N.Y.
Filed Apr. 8, 1964, Ser. No. 358,209
1 Claim. (Cl. 251—144)

This invention relates to a drain valve for removing material settling to the bottom portion of a tank and more particularly to such a drain valve for removing water and foreign matter from the fuel tanks of automotive vehicles settling from the fuel oil or gasoline carried by the fuel tank.

In automotive fuel tanks carrying diesel fuel or gasoline, water condenses along with other heavier-than-fuel impurities and collects in a sump usually provided in the bottom of the fuel tank. It is now the practice to put a screw drain plug in the bottom of the sump and when the operator decides to drain out the water and other impurities, he unscrews the drain plug. The difficulty arises in replacing the screw drain plug since it is against a flow of fuel from the drain opening and the fuel splashes all over his hands and a substantial amount of fuel is lost. This is especially aggravated when difficulty is encountered in starting the threads of the plug which difficulty is increased by the fact that the drain plug is close to the ground and not readily accessible.

It is accordingly the principal object of the present invention to provide a valve for removing material settling to the bottom portion of a tank which opens and closes instantly and which is normally closed so that after the water and other settled impurities flow out the operator can permit the valve to close instantly.

Another object of the invention is to provide such a valve in which the hand of the operator need not come in contact with the fluid being drained either in starting or stopping the flow of fluid, such starting and stopping being achieved by the use of a simple and readily accessible instrument, such as a pencil, piece of wire, short stick, screw driver or other thin elongated instrument.

Another important object of the invention is to provide such a valve which is sealed closed in the conventional and approved manner, namely by means of a screw plug.

Another object of the invention is to provide such a valve which is simple, inexpensive and rugged in construction and will stand up under conditions of severe and constant use without getting out of repair.

Other objects and advantages will be apparent from the following description and drawings in which:

FIG. 1 is a vertical section through the bottom portion of a fuel tank for an automotive vehicle, this section being taken fore-and-aft of the line of travel of the vehicle through a drain valve embodying the present invention.

FIG. 2 is an enlarged view similar to FIG. 1, illustrating in greater detail the construction of the drain valve.

FIG. 3 is a fragmentary horizontal section taken generally on line 3—3, FIG. 1.

FIG. 4 is a side elevational view of a piece of wire suitable for opening the valve.

The drawings illustrate the bottom portion or bottom wall 5 of a fuel tank 6 carried by an automotive vehicle and supplying fuel, such as diesel oil or gasoline, for propelling of the vehicle. While the valve forming the subject of the present invention can be mounted directly in the bottom wall 5, it is desirable to provide a sump 8 extending below the bottom wall 5 and which will hold a substantial amount of water or other heavier-than-fuel impurities settling to the bottom of the tank and into the sump. Such water accumulates though condensation from from moisture in the air and the other foreign material can come from various sources. The presence of the sump 8 permits a large quantity of water and such other foreign material to build up in the sump thereby to reduce the frequency with which the water and such other impurities must be removed.

While the sump can be of any suitable form it is shown as having a bottom wall 9 sloping rearwardly and downwardly from a vertical front wall 10 to a rear wall 11 which preferably slopes upwardly and rearwardly from the rear edge of the bottom wall 9. The side walls 12 can be vertical. The front wall 10 faces the front of the automotive vehicle. The top rim formed by the walls 10, 11 and 12 can be secured, as by welding 13, to the underside of the bottom wall 5 of the tank.

In order to permit heavier-than-fuel contaminants to flow from the bottom of the tank 6 into the sump 8, above the sump the bottom wall 5 is provided with a plurality of through slots 14 which extend transversely of the line of travel of the vehicle and are preferably spaced from the sump walls 10, 11 and 12 to avoid sloshing back of water from the sump 8 into the tank 6. Also, to induce the flow of the heavier-than-fuel contaminants through the openings 14 the material removed in making these openings is preferably offset upwardly along one longitudinal edge thereof so as to form upwardly inclined flanges. Some of these flanges, indicated at 15, can incline upwardly and forwardly with reference to the forward line of movement of the vehicle whereas the others, indicated at 16 can incline upwardly and rearwardly. By this means, each time the vehicle is accelerated or decelerated the heavier-than-fuel contaminants are urged against the flanges 15 or 16 which serve to accelerate their settling into the sump 8.

While the valve forming the subject of the present invention could be placed in the bottom wall 9 of the sump, or in the bottom wall of the fuel tank, it is desirable to place the valve in the lower part of the inclined rear wall 11 so that the valve is out of the way of stones and the like thrown up by the tires of the vehicle. The valve is shown as having a valve body 20 secured, as by welding 21, across an opening 22 in a bottom portion of the tank 6, such as the rear wall 11 of its sump 8. This valve body has a through bore 23 one end of which is in communication with the interior of the sump 8 and tank 6 and the other end of which forms a drain opening to ambient. This bore 23 is shown as being internally threaded and as containing an externally threaded bushing 24 screwed therein from the outside sufficiently firmly to be leak proof. This bushing also has an internal through bore 25 the end which adjacent the sump 8 is in the form of a counterbore 26 forming an inner shoulder 28 facing the interior of the sump 8 and the outer end of which is internally threaded as indicated at 29.

In the counterbore 28 is press fitted a second bushing 30 this second bushing having an end wall seated against the seat 28 and which wall is formed to provide a central conical valve seat 31 facing the interior of the sump 8 and surrounding a valve opening 32 providing communication between the interior of the sump 8 and the drain end of the bore 25. This valve opening 32 is normally closed by a ball 33 housed in the bushing 30 and which can be of brass, plastic or other material and can be held in place by the rim of the bushing adjacent the opening 22 being struck to form indentations or fingers 34 which project radially inwardly.

As previously indicated, the outer end of the bore 25 of the bushing 24 is internally threaded, as indicated at 29, and in these threads is screwed a conventional screw plug 35 which can be removed by means of a conventional wrench and which seals the bore 25 against leakage of fuel in the same manner as fuel drain valves as now constructed.

In use, assuming that a quantity of water, with or without other heavier-than-fuel foreign matter or contaminants, has accumulated in the sump 8, the operator first removes the screw plug 35 by means of a wrench. The operator then bends a piece of available wire into a hook 36, or uses a straight elongated thin object, such as a piece of straight wire or his pencil, and inserts it through the bore 25 and valve opening 32 against the ball 33 and pushes this ball away from its seat 31. Immediately the water and other contaminants start to flow from the sump 8 through this valve opening 32 into a catch pan (not shown) and the operator retains pressure against the piece of wire 36 until he observes that the flow of water has stopped and the flow of fuel oil has commenced. He thereupon withdraws the piece of wire 36 and the ball 33 immediatly snaps closed against its seat 31, such movement being produced by the velocity of the passing fuel oil.

With the drain valve now closed and flow of fuel oil stopped the operator can carefully start the threads of the screw plug 35 into the threaded bore 25 and replace this screw plug, finally tightening the same with a wrench so as to have the same drain valve seal as is now conventional with automotive fuel tanks and which would provide against the escape of fuel oil even in the event of some failure of the ball 33 which could only permit a small amount of liquid to pass to the sealed end of the valve.

As previously indicated the valve could be vertically disposed in the bottom wall 5 or 9 of either the oil tank or its sump with its conical seat 31 facing vertically upwardly so that the ball 33 would tend to center itself on its seat by gravity. However, it has been found that the velocity of the liquid passing this ball in flowing through the valve opening 32 is sufficient to close this valve instantly, once the restraining pencil or piece of wire has been removed, thereby to prevent the necessity for the operator attempting to insert the screw plug 35 against a flowing stream of liquid with the usual splashing around of the liquid, particularly on his hands, as well as serving to conceal the screw opening and rendering the operation more difficult.

I claim:

Valve means for removing water and foreign material from the bottom 9 of the fuel tank 6 of an automotive vehicle, which comprises a sump 8 in said bottom 9 having a wall 11 at the rear end thereof with reference to the line of travel of said vehicle, a tubular valve body 20, 24 having a coaxial through bore 23 and having coaxial threads 29 at one end, means 21 securing the other end of said valve body 20, 24 across an opening 22 in said rear end wall 11 with its threaded end 29 extending axially generally perpendicularly outwardly therefrom so as to be protected by said sump 8 from stones thrown upwardly from the roadway in front of said fuel tank 6, one end 26 of said through bore being in communication with the interior of said tank 6 and the other end forming a drain opening, means 30, 31 providing a valve seat in said through bore 23 facing said interior of said tank 6 and surrounding a valve opening 32 providing communication from said one end 26 of said through bore 23 to said drain opening, a valve ball 33, means 34 loosely retaining said ball in the region of said seat 31 to be free to engage and disengage said seat, and a threaded closure member 35 adapted to be manually screwed on said threads to seal the drain opening of said through bore 23 whereby upon manual removal of said threaded closure member 35 an elongated thin instrument 36 can be inserted into the drain opening of said through bore 23 and against said ball 33 to unseat said ball and drain said water and foreign material from the bottom of the tank following which said instrument 36 can be withdrawn to permit said ball to reseat by the velocity of the fluid moving toward said valve opening 32 and thereby to permit replacement of said threaded closure member 35 without the impedance of a stream of fluid flowing from said drain opening.

References Cited by the Examiner

UNITED STATES PATENTS

| | | | |
|---|---|---|---|
| 231,997 | 9/1880 | Chamberlain | 137—322 |
| 1,574,234 | 2/1926 | Cumner | 137—322 |
| 1,659,047 | 2/1928 | Quinn | 184—106 |
| 1,839,413 | 1/1932 | Sage | 251—144 |
| 1,846,877 | 2/1932 | Knapp | 251—144 |

M. CARY NELSON, *Primary Examiner.*

W. CLINE, *Assistant Examiner.*